United States Patent
O'Kell et al.

(10) Patent No.: US 10,059,461 B2
(45) Date of Patent: Aug. 28, 2018

(54) AIRCRAFT MARKING SYSTEM

(71) Applicant: Saf-T-Glo Limited, Swaffham, Norfolk (GB)

(72) Inventors: Sean Patrick O'Kell, Penarth (GB); Andrew Jon Hallett, Cardiff (GB)

(73) Assignee: SAF-T-GLO LIMITED (GB)

(*) Notice: Subject to any disclaimer, the term of this patent is extended or adjusted under 35 U.S.C. 154(b) by 173 days.

(21) Appl. No.: 14/881,687

(22) Filed: Oct. 13, 2015

(65) Prior Publication Data
US 2016/0107764 A1    Apr. 21, 2016

(30) Foreign Application Priority Data

Oct. 17, 2014 (GB) .................................. 1418501.1
May 22, 2015 (GB) .................................. 1508799.2

(51) Int. Cl.
*B64D 45/00* (2006.01)
*B64D 47/06* (2006.01)
*G02B 5/128* (2006.01)

(52) U.S. Cl.
CPC ............. *B64D 45/00* (2013.01); *B64D 47/06* (2013.01); *G02B 5/128* (2013.01)

(58) Field of Classification Search
CPC ........ B64D 45/00; B64D 47/06; G01B 5/128; G09F 21/08
USPC .................. 116/28 R; 40/591, 592; 244/1 R; 359/548, 549
See application file for complete search history.

(56) References Cited

U.S. PATENT DOCUMENTS

| | | | | |
|---|---|---|---|---|
| 2,939,242 A | * | 6/1960 | Papadakis | A63H 27/02 156/235 |
| 3,031,645 A | * | 4/1962 | Koontz | B64D 47/06 340/981 |
| 4,299,442 A | | 11/1981 | Buckelew | |
| 4,445,161 A | * | 4/1984 | Brick | B64D 45/02 244/1 A |
| 4,644,895 A | * | 2/1987 | Cozad | B64D 39/00 116/200 |
| 5,549,940 A | * | 8/1996 | Noone | B44C 5/00 206/579 |
| 6,157,486 A | * | 12/2000 | Benson, Jr. et al. | G02B 5/124 359/487.05 |

(Continued)

FOREIGN PATENT DOCUMENTS

DE    2361569    6/1975
EP    1291403    3/2003

(Continued)

OTHER PUBLICATIONS

European Search Report and Search Opinion for EP 3009351, dated Mar. 11, 2016, 8 pages.*

*Primary Examiner* — R. A. Smith
(74) *Attorney, Agent, or Firm* — Foley & Lardner LLP

(57) ABSTRACT

An aircraft marking system for an external surface of an aircraft comprises at least one of a photoluminescent material that provides visibility in darkness, a reflective material that provides visibility when illuminated by a light source, and color that provides visibility in daylight. The marking system is applied to the wings, especially wing tips and other areas of the aircraft to reduce the risk of damage from impacts when the aircraft is on the ground and/or to indicate areas for accessing the interior of the aircraft in an emergency.

20 Claims, 2 Drawing Sheets

(56) References Cited

U.S. PATENT DOCUMENTS

| | | | |
|---|---|---|---|
| 7,252,401 B1 | 8/2007 | Plaszcz | |
| 7,401,570 B2 * | 7/2008 | Moore | B64F 1/005 |
| | | | 116/1 |
| 8,935,987 B2 * | 1/2015 | Edwards et al. | G01D 13/00 |
| | | | 116/28 R |
| 9,067,689 B2 * | 6/2015 | Chang | B64D 39/00 |
| 2005/0017130 A1 | 1/2005 | Shelly et al. | |
| 2007/0036929 A1 * | 2/2007 | Baird et al. | G09F 21/08 |
| | | | 428/40.1 |
| 2009/0127386 A1 | 5/2009 | Cote et al. | |
| 2013/0048793 A1 | 2/2013 | Edmond et al. | |
| 2014/0328694 A1 * | 11/2014 | Campbell, Jr. et al. | |
| | | | B64D 45/00 |
| | | | 416/241 R |

FOREIGN PATENT DOCUMENTS

| | | | |
|---|---|---|---|
| FR | 2860493 | 4/2005 | |
| GB | 1323529 | 7/1973 | |
| GB | 2516614 | 2/2015 | |
| JP | 2002062834 A * | 2/2002 | ............ G09F 21/08 |
| WO | WO94/17766 | 8/1994 | |
| WO | WO03/054099 | 7/2003 | |
| WO | WO2004/009723 | 1/2004 | |

* cited by examiner

AIRCRAFT MARKING SYSTEM

CROSS-REFERENCE TO RELATED PATENT APPLICATIONS

This application claims priority to and the benefit of GB Application No. 1418501.1, filed Oct. 17, 2014, and GB Application No. 1508799.2, filed May 22, 2015, the entire disclosures of which are incorporated by reference herein.

BACKGROUND

This invention relates to a marking system, a method of use and materials for use in such a system and/or method. The invention has particular, but not exclusive, application to aircraft although it may have wider application.

Airport ground support vehicles are employed for various purposes such as refueling aircraft, loading baggage on and unloading baggage from aircraft, transporting passengers to and from aircraft. Such vehicles are required to maneuver close to the aircraft with the result that the aircraft may be damaged by vehicles colliding with the aircraft.

This can be a particular problem when vehicles are required to maneuver up to, around and under the wings and/or fuselage of the aircraft with limited clearance. Damage to the aircraft from such collisions can result in costly repairs to the aircraft as well as operating losses while the aircraft is out of service.

There is therefore a need for a system of marking the external surface of an aircraft to enhance visibility.

The present invention seeks to address this need.

SUMMARY

According to a first aspect of the invention, an aircraft marking system is provided employing a photoluminescent and/or reflective material to enhance visibility of an external surface of the aircraft.

The photoluminescent material provides visibility in darkness and the reflective material provides visibility when illuminated by a light source such as the headlights of a vehicle. The marking system may also use color to improve visibility in daylight.

According to a second aspect of the invention, a method for enhancing visibility of an external surface of an aircraft is provided employing the aircraft marking system of the first aspect of the invention.

According to a third aspect of the invention, a photoluminescent and/or reflective material is provided for use in the aircraft marking system of the first aspect of the invention and/or the method of the second aspect of the invention.

Visibility of the external surface of any part of the aircraft to which the marking system has been applied may be enhanced both at night and during the day. Thus, during conditions of low ambient light such as at night, visibility of the surface to which the marking system is applied may be provided by light emitted by photoluminescent material and/or light reflected by the reflective material. During conditions of high ambient light such as in the daytime, visibility of the surface to which the marking system is applied may be provided by the presence of color, preferably a contrasting color that emphasizes the surface. In this way, parts of the aircraft susceptible to damage from collisions with, for example, airport ground support vehicles may be identified by the application of photoluminescent and/or reflective material and/or color to the external surface of such parts thereby reducing the risk of damage to the aircraft from collisions.

The invention may have particular benefit for enhancing visibility and identification of parts of the aircraft in low ambient light conditions, for example at night. Although the invention may be useful for reducing the risk of damage to the aircraft from collisions, the invention may have wider application such as enhancing visibility and identification of parts of the aircraft by rescue services where, for example, access to the interior of the aircraft is required in an emergency.

The marking system may be applied to the outer surface of an aircraft in a variety of forms, for example paint or tape or film or combinations thereof incorporating the photoluminescent and/or reflective material and/or color. Where paint is used this may be epoxy resin or polyurethane based.

The marking system may comprise a placard or sign or decal that can be applied to the outer surface of an aircraft. The marking system may incorporate one or more of text, graphics, logos for any purpose such as branding or advertising.

Suitable photoluminescent materials include, but are not limited to, strontium aluminate, strontium silicate and zinc sulfide. A combination of two or more photoluminescent materials may be employed. The photoluminescent material(s) may include one or more dopants.

Suitable reflective materials include, but are not limited to, retroreflective materials such as glass or polymeric microbeads or titanium dioxide. A combination of two or more reflective materials may be employed.

The marking system may be applied to any part of the external or outer surface of the aircraft where enhanced visibility is required or desirable.

Where the marking system includes photoluminescent material and reflective material, the relative amounts of each material may be varied to suit the operating conditions of the aircraft. For example, the amount of photoluminescent material may be increased in areas having long daylight hours and reduced in areas having short daylight hours.

The marking system may be applied to all or part of an aircraft wing to enhance visibility thereof. For example the marking system may be applied to indicate a wing tip or, where provided, a wing tip extension (also known as a winglet).

The marking system may be applied to all or part of an aircraft fuselage to enhance visibility thereof. For example the marking system may be applied to indicate an area for accessing the interior of the aircraft such as an exit door, an emergency exit, a cargo door or to indicate an area for accessing equipment such as latches on nacelles or to indicate steps or any non-rotary parts of the aircraft.

According to a fourth aspect of the invention, an aircraft is provided having a wing tip or wing tip extension provided with an aircraft marking system employing a photoluminescent material and/or reflective material to enhance visibility of an external surface of the wing tip or wing tip extension.

It may be that the marking system is applied at the end of the wing tip or wing tip extension.

It may be that the marking system is applied along a trailing edge of the wing tip or wing tip extension.

It may be that the marking system is applied to the upper and/or lower surface of the wing tip or wing tip extension.

It may be that the wing tip or wing tip extension has a section that extends downwardly from a main plane of the wing and the marking system is applied to all or part of the outer surface of the downwardly extending section.

It may be that the wing tip or wing tip extension has a section that extends upwardly from a main plane of the wing and the marking system is applied to all or part of the outer surface of the upwardly extending section.

It may be that the photoluminescent material and/or reflective material is provided in the form of paint or tape or film or combinations thereof incorporating the photoluminescent material and/or reflective material.

It may be that the marking system comprises a placard or sign or decal that can be applied to the outer surface of an aircraft. The marking system may incorporate one or more of text, graphics, logos for any purpose such as branding or advertising.

It may be that the photoluminescent material is selected from strontium aluminate, strontium silicate and zinc sulfide.

It may be that the reflective material is retroreflective.

It may be that the retroreflective material comprises microbeads.

It may be that the microbeads are selected from glass microbeads and polymeric microbeads.

It may be that the marking system includes both photoluminescent material and reflective material.

It may be that the relative amounts of each material can be varied to suit the operating conditions of the aircraft.

It may be that the amount of photoluminescent material is increased in areas having long daylight hours.

It may be that the amount of reflective material is increased in areas having short daylight hours.

It may be that the marking system uses color to improve daylight visibility.

BRIEF DESCRIPTION OF THE DRAWINGS

Embodiments of the invention will now be described by way of example only with reference to the accompanying drawings wherein.

DETAILED DESCRIPTION

Figure 1:
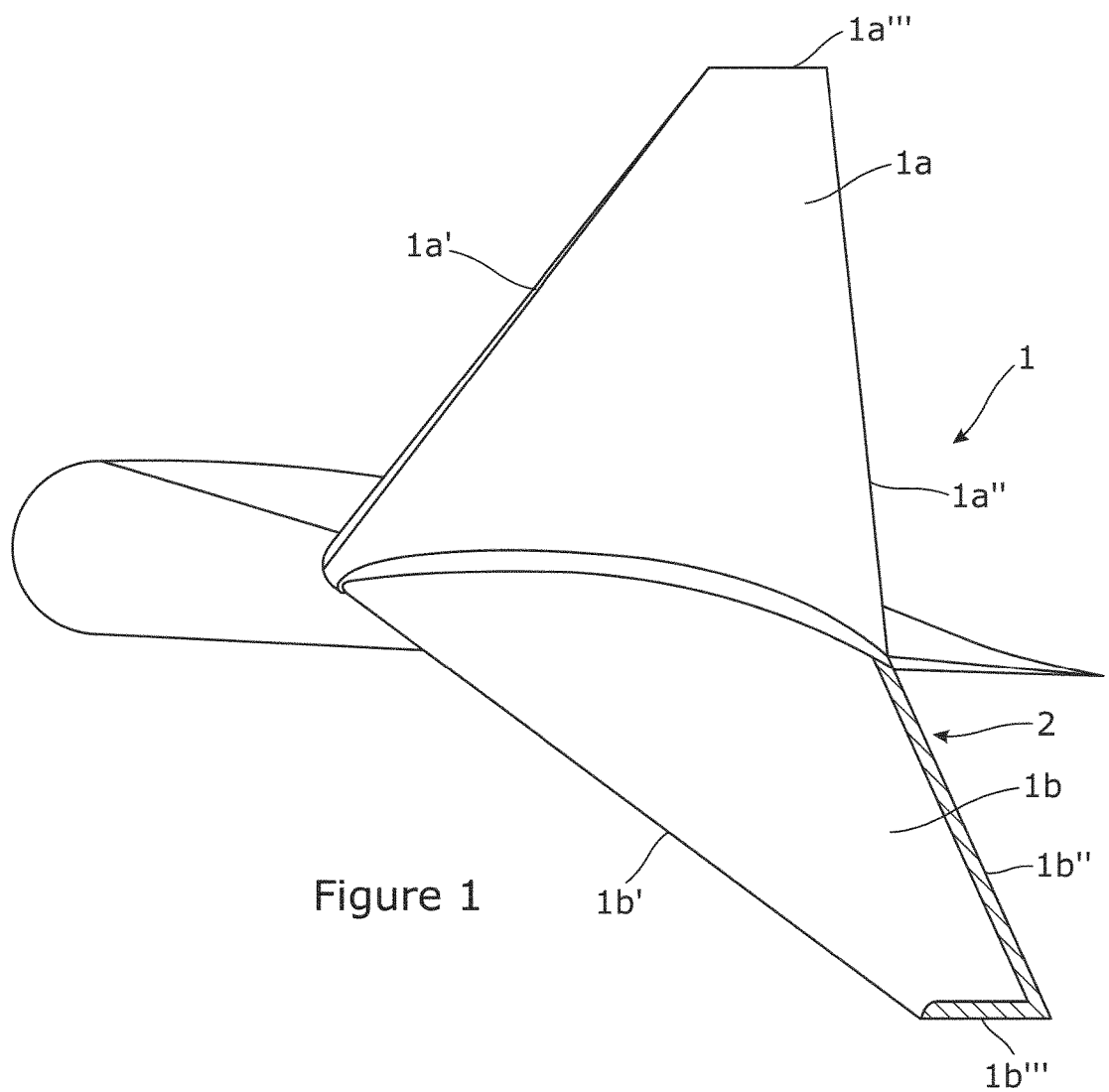
FIG. 1 shows application of the invention to an aircraft winglet.
Figure 2:
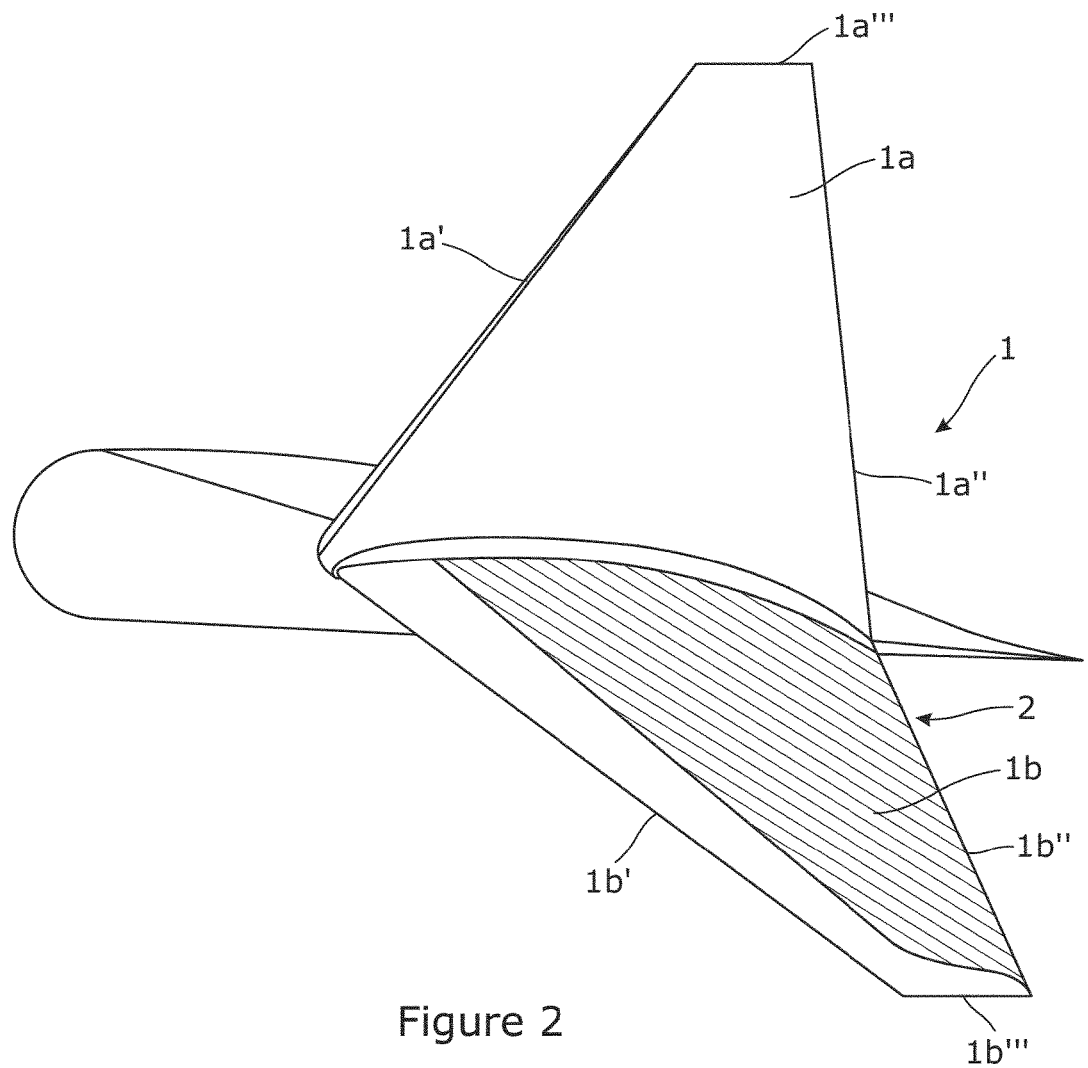
FIG. 2 shows an alternative application of the invention to an aircraft winglet.

Referring first to FIGS. 1 and 2, an aircraft winglet 1 is shown. The winglet 1 is a wing tip extension for the wing of an aircraft (not shown) to reduce lift induced drag and provide some extra lift. The winglet 1 may be incorporated during manufacture of the wing or added as a retrofit to an existing wing.

In this embodiment, the winglet 1 shown in FIG. 1 is a split-scimitar winglet having two sections 1a, 1b that extend upwardly and downwardly respectively with respect to the main plane of the wing. This is not essential and other embodiments may comprise alternative designs of winglet.

The downwardly extending section 1b of the winglet 1 can be particularly susceptible to damage from collisions with airport ground support vehicles that are required to maneuver close to and pass under the winglet 1. The downwardly extending section 1b can also present a safety hazard to ground staff working close by and/or walking under the winglet 1.

In accordance with the present invention, the winglet 1 is provided with a marking system 2 to enhance visibility of the winglet 1 and in particular, the downwardly extending section 1b.

The marking system 2 comprises a photoluminescent material and/or a reflective material, preferably retroreflective material, which may be applied to substantially all the external or outer surface of the winglet 1 or to part of the external or outer surface of the winglet 1.

In this embodiment the marking system 2 is applied to the upper and/or lower surfaces of the downwardly extending section 1b of the winglet 1. Alternatively or additionally, the marking system 2 may be applied to the upper and/or lower surfaces of the upwardly extending section 1a of the winglet 1.

FIG. 1 shows the marking system 2 applied to the upper and/or lower surfaces of the downwardly extending section 1b of the winglet 1 along one or more edges, preferably the trailing edge 1b", and/or the end or tip 1b''' thereof. It may be preferred that the marking system is not applied to the leading edge 1b' thereof.

FIG. 2 shows the marking system 2 applied to substantially all of the upper and/or lower surfaces of the downwardly extending section 1b of the winglet 1. It may be preferred that the marking system is not applied to the leading edge 1b' thereof.

In other embodiments the marking system 2 may be applied to the upper and/or lower surfaces of the upwardly extending section 1a of the winglet 1.

In some embodiments, the marking system 2 may be applied to the upper and/or lower surfaces of the upwardly extending section 1a of the winglet 1 along one or more edges, preferably the trailing edge 1a", and/or the end or tip 1a''' thereof. It may be preferred that the marking system is not applied to the leading edge 1a' thereof.

In other embodiments, the marking system 2 may be applied to substantially all of the upper and/or lower surfaces of the upwardly extending section 1a of the winglet 1. It may be preferred that the marking system is not applied to the leading edge 1a' thereof.

In other embodiments, the marking system 2 may be applied to the upper and/or lower surfaces of the downwardly extending section 1b of the winglet 1 and/or the upwardly extending section 1a of the winglet 1. It may be preferred that the marking system is not applied to the leading edges 1b', 1a' thereof.

In this embodiment, the marking system 2 comprises a photoluminescent material, such as strontium aluminate, strontium silicate or zinc sulfide, and a reflective material, preferably retroreflective, such as retro-reflective glass or polymeric microbeads or titanium dioxide, in the form of a paint which can be applied to the winglet 1.

In other embodiments, the paint may include photoluminescent material without reflective material and in other embodiments the paint may include reflective material without photoluminescent material.

The paint may be of any suitable type capable of withstanding the conditions of use and may be epoxy resin or polyurethane based although other paint types are not excluded.

The photoluminescent material is not limited to the examples provided and may be of any suitable type. The reflective material is not limited to the examples provided and may be of any suitable type.

The combination of photoluminescent material and reflective material may be particularly advantageous in enhancing visibility of the winglet 1 to ground staff and other personnel who may be working in the vicinity of the aircraft either on foot or driving ground support vehicles.

The photoluminescent material is charged by exposure to ambient light such as during the daytime and enhances dark visibility by emitting light that is visible in conditions of low ambient light levels such as during the night-time.

The reflective material, preferably retroreflective material, reflects light from a light source back towards the light source and enhances dark visibility when illuminated by a light source such as the headlights of a ground support vehicle.

The marking system 2 is operable without requiring any connection to batteries, electrical supply or other power source and is maintenance free other than keeping the paint clean so that the photoluminescent material can absorb/emit light and the reflective material can reflect light.

Although the visible light emitted by the photoluminescent material may be of a relatively low intensity that is not normally visible during the daytime it is sufficient to be seen during low ambient light conditions.

Where the marking system 2 comprises a combination of photoluminescent material and reflective material, preferably retroreflective material, the relative amounts of each material may be varied to suit different operating conditions.

The relative proportions may be adjusted to increase the amount of reflective material where the aircraft spends long periods of time in areas of the world with shorter daylight hours, and to increase the amount of photoluminescent material where the aircraft spends long periods of time in areas of the world with longer daylight hours.

The application of the paint could provide decorative or aesthetic effects and/or may contain or display information. For example, the application of the paint could include text or graphics for displaying branding or airline logos or other symbols or emblems using any suitable method such as stenciling.

The reflective material provides visibility when illuminated by a light source such as with the headlights of a vehicle and the photoluminescent material provides dark visibility through the emission of light so as to reduce the risk of damage to the winglet 1 from collisions with other vehicles and/or equipment when the aircraft is on the ground. The marking system 2 may also reduce the risk of damage to the winglet 1 by the use of color to improve visibility of the winglet 1 in daylight. For example where the marking system 2 employs paint, the paint can be of a contrasting color that emphasizes the presence of the winglet 1 in daylight.

In this embodiment, the marking system 2 is provided in the form of a paint that acts as a carrier for the photoluminescent material and the reflective material and may be applied to the external or outer surface of the aircraft. It will be understood this is not essential and that other carriers may be employed.

In other embodiments, the marking system 2 may be provided in the form of a placard, sign or decal which acts as a carrier for both the photoluminescent material and the reflective material and may be applied to the external or outer surface of the aircraft. The placard, sign or decal may comprise a tape or film. It will be understood this is not essential and that other carriers may be employed.

The tape or film may be self-adhesive. The tape or film may be of any suitable type capable of withstanding the conditions of use and may include a transparent or translucent, light transmitting protective cover material.

Where a tape or film is employed, the photoluminescent material and reflective material may be applied to separate areas of the tape or film. For example the tape or film may comprise at least one area of photoluminescent material and at least one area of reflective material.

In some embodiments, the marking system 2 may comprise an area of reflective material, partially covered by an area of photoluminescent material, preferably with a white undercoat in the photoluminescent area. In some embodiments, the marking system 2 may comprise a protective clear topcoat, preferably a polymer, covering the reflective area and photoluminescent area.

Where the marking system 2 is in the form of a placard, sign or decal the topcoat preferably consists of a polymer such as a cross linked, UV cured polymer but could be any amorphous reaction polymer or single component polymer. The topcoat material used may be the equivalent of the surface of the aircraft. Polyurethane may be the preferred topcoat material.

The topcoat may comprise one or more layers. The or each topcoat layer may have a minimum thickness of 10 microns, more preferably 15 microns and most preferably 20 microns. The or each topcoat layer may have a maximum thickness of up to 500 microns, more preferably, 250 microns and most preferably 60 microns.

The area of photoluminescent material may be surrounded by the reflective area. The reflective area may comprise a reflective film base. Alternatively, the area of reflective material may be surrounded by the photoluminescent area. The photoluminescent area may comprise an epoxy resin containing the photoluminescent material. The reflective area or the photoluminescent area may be colored to improve daylight visibility.

In some embodiments, the marking system 2 may comprise a protective clear edge sealer, preferably a polymer, around the edges of the reflective material.

Where the marking system 2 is in the form of a placard, sign or decal applied to the outer surface of the aircraft, the edge sealer preferably consists of a polymer such as a cross linked, UV cured polymer but could be any amorphous reaction polymer or single component polymer. The edge sealer material may be the equivalent of the surface of the aircraft. The edge sealer material may be the equivalent of the topcoat. Polyurethane may be the preferred edge sealer material.

Where provided, the topcoat and/or edge sealer ensure that the marking system is amalgamated into the surface structure of the aircraft. This may result in one or more of the following benefits and advantages:

Reduction of drag (flutter) on aircraft
Consistent aerodynamics for the aircraft
Abrasion resistance
Chemical resistance to typical aviation fluids (de-icers, fuel, oil, hydraulic fluid)
Increased lifetime
Reduction of possibility of in service mechanical failure of placard In other embodiments, the tape or film may include photoluminescent material without reflective material and in other embodiments the tape may include reflective material without photoluminescent material.

Any other suitable carrier for the photoluminescent material and/or the reflective material may be employed.

Where the marking system 2 comprises both photoluminescent material and reflective material, a single carrier may be employed for applying both materials together.

Alternatively, a separate carrier may be provided for applying each material separately. For example, the photoluminescent material may be provided in the form of paint as described above and the reflective material may be provided in the form of a reflective film applied over the photoluminescent paint.

Where the marking system 2 employs paint, the base material preferably has the same characteristics as the marking system employing a placard, sign or decal.

In this embodiment, the marking system 2 is applied to the winglet 1. It will be understood however that the marking system 2 could be applied to the external or outer surface of any part of the aircraft where it is desired to enhance visibility.

In this embodiment, the marking system 2 is applied to the external or outer surface of a part of the aircraft, namely the winglet 1, to enhance visibility so as to reduce the risk of collisions with airport ground support vehicles that are required to maneuver close to and pass under the wing and the risk of injury to ground staff working close by and/or walking under the wing.

It will be understood however that the marking system 2 could be applied to the external or outer surface of other parts of the aircraft where it is desired to enhance visibility for other purposes.

The marking system 2 could be applied to a part of the aircraft to assist identification of that part in conditions of low ambient light levels. For example, the marking system 2 could be used to assist identification of latches on nacelles or leading edges of steps or any non-rotary movable parts.

Figure 3:
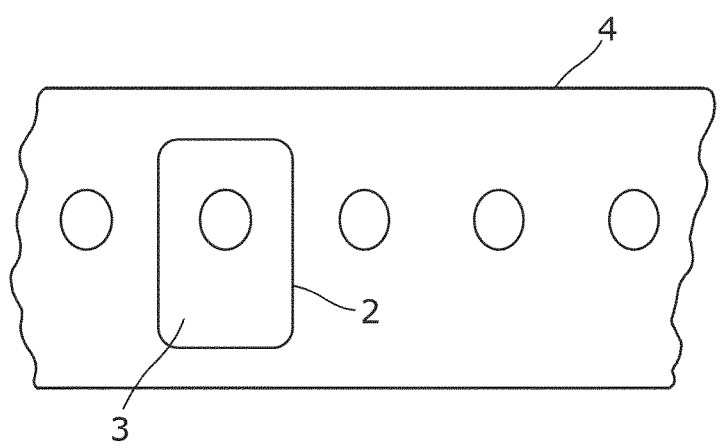
FIG. 3 shows application of the invention to an aircraft emergency exit.

Referring now to FIG. 3, the marking system 2 is employed to identify an emergency exit 3 in the side of the fuselage 4 of an aircraft.

In this embodiment the marking system 2 is applied to the fuselage 4 to extend around the exit 3 to enhance visibility of the location of the exit 3.

This may be advantageous in assisting rescue services to locate and identify the exit 3 in conditions of low ambient light levels. For example to gain access to the interior of the aircraft in an emergency such as following an accident in conditions of low ambient light levels such as during the night-time.

The marking system 2 may comprise photoluminescent material and/or reflective material in the form of paint or tape or film or any other carrier as described with reference to the embodiment of FIG. 1 and is therefore not described again as the skilled person will easily understand the details of the marking system from the description of FIG. 1.

In this embodiment, the marking system 2 applied to the fuselage 4 is continuous around the entire perimeter of the exit 3.

In other embodiments, the marking system 2 may be discontinuous around the perimeter of the exit 3. In other embodiments, the marking system may extend around the exit 3 with breaks at one or more places around the perimeter such as the corners.

In other embodiments the marking system 2 may be applied to the fuselage 4 above and/or below the exit 3. In other embodiments the marking system 2 may be applied to the fuselage 4 on one or both sides of the exit 3.

In other embodiments, the marking system 2 may be applied to the exit 3. The marking system 2 may be continuous or around the entire perimeter of the exit 3.

In other embodiments, the marking system 2 may be discontinuous around the perimeter of the exit 3. In other embodiments, the marking system may extend around the exit 3 with breaks at one or more places around the perimeter such as the corners.

In other embodiments the marking system 2 may be applied to the exit 3 at the top and or bottom. In other embodiments the marking system 2 may be applied to the exit 3 on one or both sides.

In other embodiments, the marking system 2 may be applied to the exit 3 to assist identification of a release mechanism for opening the exit 3 from the exterior of the aircraft.

In this embodiment, the marking system 2 is applied to assist identification of an emergency exit. It will be understood however, that it could be applied to identify any other part of the aircraft.

In other embodiments, the marking system 2 could be applied to identify the normal exit(s) and/or any other access point such as the hold for storing luggage.

In other embodiments, the marking system 2 could be applied to identify an area of the aircraft configured to facilitate access to the interior of the aircraft in an emergency where entry through the normal exit(s) and emergency exit(s) is prevented.

The marking system 2 might be employed to indicate an area of the fuselage that is easier to cut open in an emergency for accessing the interior of the aircraft.

Although the invention has been described in the exemplary embodiments with reference to an airplane, it will be understood that the benefits and advantages of the marking system may have wider application to other types of aircraft such as helicopters where the marking system may be applied to the body and/or the rotor blades. The invention might also have application to other vehicles and/or buildings.

The construction and arrangement of the elements of the marking system, and components thereof, as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. The elements and assemblies may be constructed from any of a wide variety of materials that provide sufficient strength or durability, in any of a wide variety of colors, textures, and combinations. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. An aircraft marking system comprising an external surface of an aircraft comprising a photoluminescent material, a reflective material, and a color to enhance visibility of the external surface to users of airport ground support vehicles, the external surface being at least part of at least one of a wing and an aircraft fuselage; wherein the photoluminescent material, the reflective material, and the color are provided as at least one of a paint, a tape, and a film; wherein the marking system is not applied along a leading edge; and wherein the color of the external surface contrasts with an adjacent surface to enhance visibility of the external surface in daylight.

2. The aircraft marking system of claim 1, wherein the reflective material is retroreflective.

3. The aircraft marking system of claim 2, wherein the retroreflective material comprises microbeads.

4. The aircraft marking system of claim 1, wherein the aircraft marking system is employed to indicate a wing tip or a wing tip extension.

5. The aircraft marking system of claim 1, wherein the aircraft marking system is employed to indicate an area for accessing an interior of the aircraft.

6. The aircraft marking system of claim 1, wherein the aircraft marking system is in the form of a placard, a sign, or a decal.

7. An aircraft comprising an external surface of a wing tip or a wing tip extension provided with an aircraft marking system comprising a photoluminescent material, a reflective material, and a color to enhance visibility of the external surface of the wing tip or the wing tip extension to users of airport ground support vehicles; wherein the aircraft marking system is provided as at least one of a paint, a tape, and a film; wherein the aircraft marking system is not applied along a leading edge; and wherein the color of the external surface contrasts with an adjacent surface to enhance visibility of the external surface in daylight.

8. The aircraft of claim 7, wherein the color enhances visibility of a lower surface of the wing tip or wing tip extension.

9. The aircraft of claim 7, wherein the aircraft marking system is applied at an end of the wing tip or wing tip extension.

10. The aircraft of claim 7, wherein the aircraft marking system is applied along a trailing edge of the wing tip or wing tip extension.

11. The aircraft of claim 7, wherein the aircraft marking system is applied to at least one of an upper surface or a lower surface of the wing tip or wing tip extension.

12. The aircraft of claim 7, wherein the wing tip or wing tip extension includes a section that extends downwardly from a main plane of the wing with the marking system being applied to all or part of an outer surface of the downwardly extending section, includes a section that extends upwardly from a main plane of the wing with the marking system being applied to all or part of an outer surface of the upwardly extending section, or includes both.

13. The aircraft of claim 7, wherein the reflective material is retroreflective.

14. The aircraft of claim 7, wherein the aircraft marking system is in the form of a placard, a sign or a decal.

15. The aircraft of claim 7, wherein the photoluminescent material comprises at least one material selected from the group consisting of strontium aluminate, strontium silicate, zinc sulphide, and doped strontium aluminate.

16. The aircraft of claim 7, wherein the photoluminescent material comprises doped strontium aluminate.

17. The system of claim 1, wherein the photoluminescent material comprises at least one material selected from the group consisting of strontium aluminate, strontium silicate, zinc sulphide, and doped strontium aluminate.

18. An aircraft comprising:
a fuselage having an external surface; and
a marking system provided on the external surface, the marking system comprising at least one of a paint, a tape, and a film that comprises a photoluminescent material, a reflective material, and a color to enhance visibility of the external surface to airport ground support personnel; wherein the color of the external surface contrasts with an adjacent surface to enhance visibility of the external surface in daylight.

19. The aircraft of claim 18, wherein the marking system extends discontinuously around a perimeter of a door or a nacelle.

20. The aircraft of claim 19, wherein the photoluminescent material comprises doped strontium aluminate.

* * * * *